No. 760,940. PATENTED MAY 24, 1904.
L. F. WEEBUR.
AUTOMATIC BRAKE.
APPLICATION FILED FEB. 26, 1904.
NO MODEL. 2 SHEETS—SHEET 1.
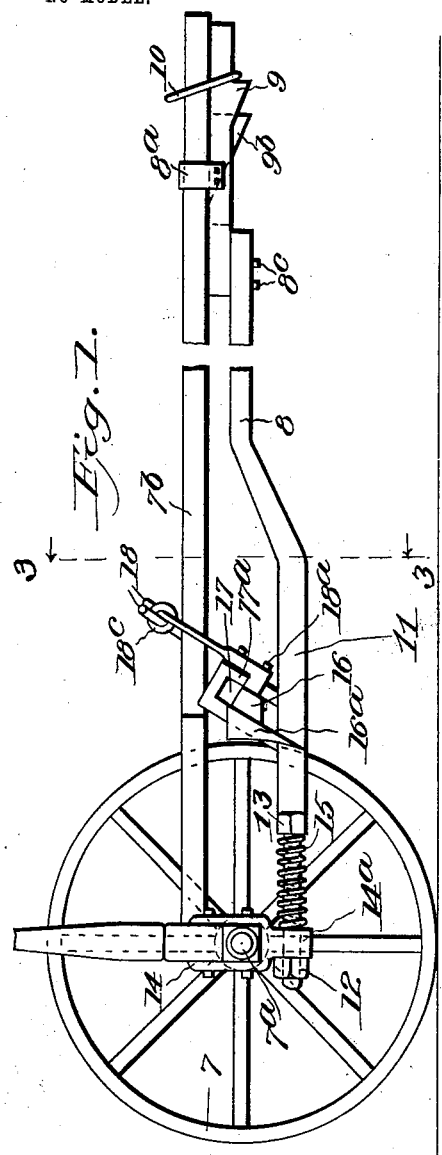
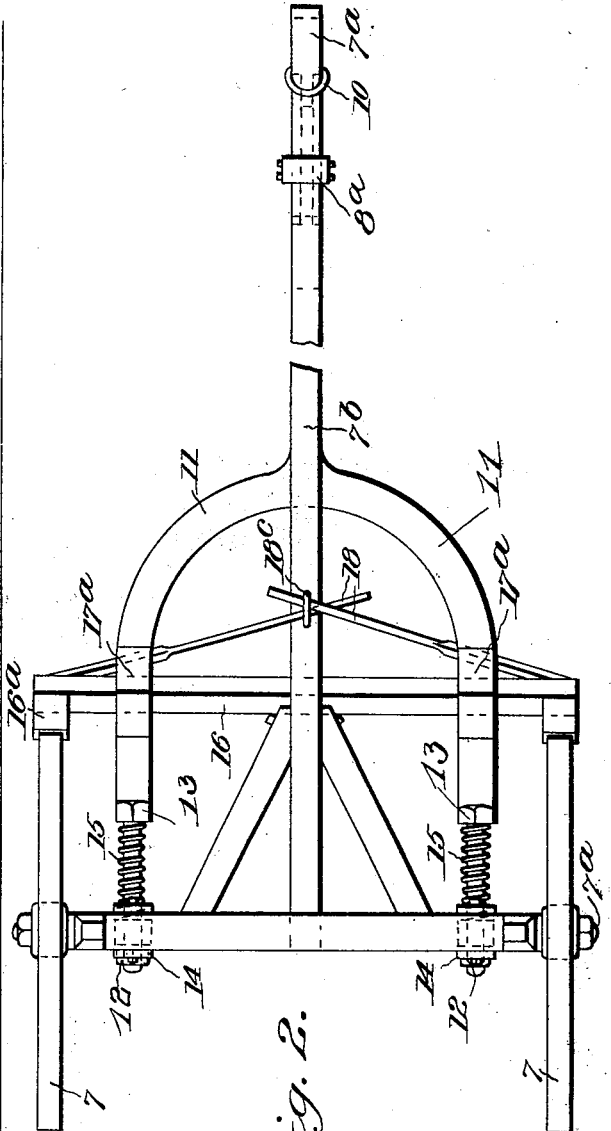
WITNESSES:
C. N. Walker
M. A. Schmidt
Leonard F. Weebur INVENTOR
BY
Milo B. Stevens & Co.
Attorneys

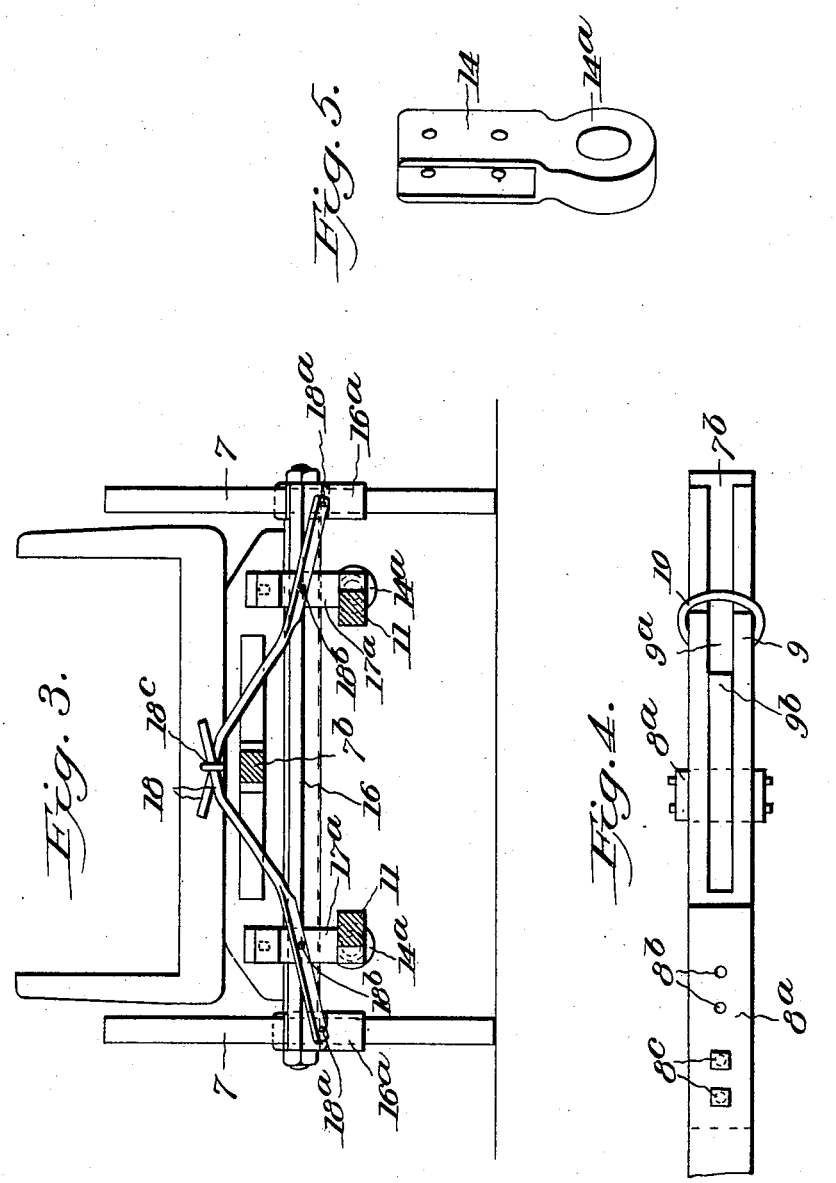

No. 760,940.

Patented May 24, 1904.

UNITED STATES PATENT OFFICE.

LEONARD F. WEEBUR, OF SOUTH MINNEAPOLIS, MINNESOTA.

AUTOMATIC BRAKE.

SPECIFICATION forming part of Letters Patent No. 760,940, dated May 24, 1904.

Application filed February 26, 1904. Serial No. 195,352. (No model.)

*To all whom it may concern:*

Be it known that I, LEONARD F. WEEBUR, a citizen of the United States, residing at South Minneapolis, in the county of Hennepin and State of Minnesota, have invented new and useful Improvements in Automatic Brakes, of which the following is a specification.

My invention relates to brakes for wheeled vehicles, and more particularly a brake which will be automatically applied when the animals hold back, as in going downhill.

The object of the invention is to provide a brake of this kind which shall be simple in construction, readily attachable to the vehicle without altering the construction thereof, and reliable in operation.

A further object is to provide a construction whereby the brake shall be rendered inoperative when the vehicle is backed.

In the accompanying drawings, Figure 1 is a side elevation of a wagon provided with my brake. Only so much of the wagon is shown as will suffice to show the connection of the invention therewith. Fig. 2 is a plan view. Fig. 3 is a vertical section on the line 3 3 of Fig. 1. Fig. 4 is a bottom plan view of the front part of the brake-supporting frame. Fig. 5 is a perspective view of the clip whereby the frame is secured to the axle of the wagon.

Referring specifically to the drawings, the front wheels of the wagon are indicated at 7, the axle at $7^a$, and the pole or tongue at $7^b$. The brake is supported by a frame 8, which is hung under the pole by a strap $8^a$ near its front end, through which the pole extends. The front part of the frame is divided and the two pieces thus formed have holes $8^b$ for bolts $8^c$, whereby they are adjustably coupled according to the length of the poles. Near the front end, on the under side thereof, the frame 8 has a projection 9 engageable by the neck-yoke ring 10. It is also forked, as at $9^a$, to receive a projection $9^b$ on the under side of the pole for a purpose to be hereinafter described.

The rear end of the frame has two branches 11 extending outwardly toward the wheels. The rear ends of both branches are threaded, and each receives nuts 12 and 13, which form collars thereon. At 14 is indicated a clip which is fastened to the axle and has a depending ring $14^a$. A clip is provided for each of the branches 11, their rear ends extending loosely through the ring portion $14^a$, whereby the frame is secured to the axle. The nuts 12 are behind the rings $14^a$, and between said rings and the nuts 13 strong spiral springs 15 are coiled around the branches 11 of the frame. These springs normally push the frame forwardly from the axle for a purpose to be hereinafter described. The nuts 12 and 13 permit adjustment of the brake and also serve to regulate the tension of the springs.

The brake-beam is indicated at 16 and has at each end brake-blocks $16^a$, secured thereto in any suitable manner. The brake-beam slides up and down in slots 17, extending through guide-block $17^a$ on the frame. The slots slant forwardly from the axle, so that when the brake-beam slides upwardly therein the brake-blocks will move away from the wheels. To the outer ends of the brake-beam levers 18 are pivoted, as at $18^a$, and fulcrumed at $18^b$ to the guide-blocks. Midway between the outer ends of the brake-beam these levers cross each other, and a ring $18^c$ is slipped over them. When the brake-beam slides up and down in the guide-slots, these levers slide back and forth through the ring, whereby the brake-beam is held in horizontal alinement. By thus preventing it from tilting sidewise the brake-blocks will move uniformly.

The operation of the brake is as follows: The frame being secured to the pole and axle, as already described, the neck-yoke ring 10 is slipped over the front end of the pole and the frame, so as to lie against the projection 9 on the latter. The springs 15 push the frame forwardly, as already described, whereby the brake-shoes are normally disengaged from the wheels. Now in going downhill when the animals hold back the ring 10 engaging the projection 9 will push the frame rearwardly against the tension of the springs 15 and set the brake. The projection $9^b$ on the tongue prevents the ring from sliding rearwardly too far. When the back draft on the neck-yoke ring is removed, the springs will push the frame forwardly to its original position, whereby the brake is released. In backing the wagon the frame will also be pushed back, so that the brake engages the wheels, but not in operative position, as the wheels in turning backward will cause the brake-beam to slide upwardly in the guide-slots 17ª, and as said slots slant forwardly away from the axle the brake-blocks will move away from the wheels.

Having thus described my invention, what is claimed as new, and desired to be secured by Letters Patent, is—

1. The combination with a wagon, of an automatic brake therefor comprising a frame slidably supported on the tongue and axle, blocks on the frame having forwardly-sloping guide-slots, a brake-beam extending through said slots and provided with brake-blocks, means for holding the brake-beam in horizontal alinement, means for normally holding the frame forwardly to render the brake inoperative, and means for setting the brake by back draft on the wagon.

2. The combination with a wagon, of an automatic brake therefor comprising a frame slidably supported on the tongue and axle, blocks on the frame having forwardly-sloping guide-slots, a brake-beam extending through said slots and provided with brake-blocks, means for holding the brake-beam in horizontal alinement, means operable by the back draft on the wagon for sliding the frame rearwardly to set the brake, and means for returning the frame to release the brake.

3. The combination with a wagon, of an automatic brake therefor comprising a frame slidably supported on the pole and axle, blocks on the frame having forwardly-sloping guide-slots, a brake-beam extending through said slots and having brake-blocks, levers pivoted to the outer ends of the brake-beam and fulcrumed on the blocks, said levers having their inner ends crossed and coupled, whereby the brake-beam is held in horizontal alinement, means operable by the back draft on the wagon for sliding the frame rearwardly to set the brake, and means for returning the frame when the back draft is removed, to release the brake.

In testimony whereof I have signed my name to this specification in the presence of two subscribing witnesses.

LEONARD F. WEEBUR.

Witnesses:
  LARS M. RAND,
  HARRY A. LUND.